Patented May 6, 1941

2,240,496

UNITED STATES PATENT OFFICE 2,240,496

PHARMACEUTICAL COMPOSITION OF THE SULPHANILAMIDE CLASS

Michael N. Dvornikoff, St. Louis, Mo., assignor to Monsanto Chemical Company, St. Louis, Mo., a corporation of Delaware No Drawing. Application May 13, 1939, Serial No. 273,542

1 Claim. (Cl. 260—397.7)

This invention relates to a new product of sulphanilamide type having useful pharmaceutical properties, and it has as its principal object the provision of a therapeutically active composition which is effective not only against streptococcic but also against pneumococcic organisms and further can be administered as an aqueous solution of its neutral salts, for example the sodium salt.

It is known that many sulphanilamide type compounds are effective against streptococcic infection. However, only a few of these are also effective against pneumococcic organisms. It is also known that the usefulness of many otherwise valuable sulphanilamide derivatives is restricted by reason of the fact that the material cannot be injected intravenously, either because it is not sufficiently soluble in water and does not form soluble salts, or if it does form soluble salts, the salt is of a pH which is too acid or alkaline to be administered safely.

I have now discovered a compound, which I refer to as N-(p-amino-benzene-sulphonyl) benzamide, having the formula—

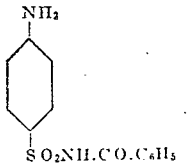

which possesses to a marked degree the desirable properties outlined above.

In preparing the product, I first react benzoyl chloride with either an aqueous solution of the sodium salt of p-acetyl-amino-benzene-sulphonamide or with the dry sodium salt suspended in toluene. This reaction may be represented as follows:

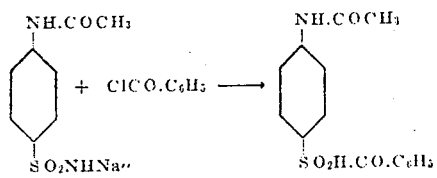

Due to its inherent acidic nature, the resulting product can be separated readily from unreacted p-acetylamino-benzene-sulphonamide by rendering the aqueous medium containing the same neutral or slightly acid and filtering. The filtrate is then acidified to precipitate the acetyl derivative which is washed with hot water to remove benzoic acid and if desired may be purified further by dissolving in alcohol and precipitating the product from solution by dilution with water. On titration with alkali, it consumes the expected amount of alkali for a monobasic acid. The acetyl derivative thus obtained melts at 245°–248° C. (uncorrected).

The acetyl-benzoyl derivative so obtained is then refluxed in dilute hydrochloric acid preferably containing a small amount of alcohol for 3 or 4 hours. The acetyl group is split off, and the free amine liberated and precipitated by the addition of a mineral base, for example caustic soda. Alternatively and preferably, the hydrolysis may be effected in a dilute aqueous alkaline solution, using approximately 2.5 mol. equivalent of NaOH. The free amine is liberated and precipitated by addition of a mineral acid.

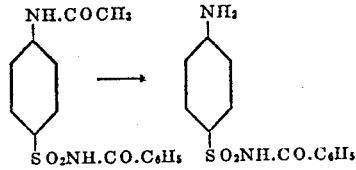

The free amine resulting from the hydrolysis and liberation is filtered from the aqueous medium and recrystallized from dilute alcohol, using charcoal to improve the color if necessary. The product so obtained melts at 178–179° C. (uncorrected) and titrates with caustic soda as if it were a mono-basic acid, forming a substantially neutral salt which can be recovered conveniently as a white solid by evaporation of the water.

The amount of $NaNO_2$ required to diazotize the amine corresponds to the formula given above.

Although this material is not quite as effective as sulphanilamide against streptococcus, it is more effective against pneumococcus as evidenced by the following tests on white mice. The pneumococcus organism was Binda Type II.

| Compounds: | Per cent survival |
|---|---|
| None | 0 |
| Sulphanilamide | 29 |
| N - (p-aminobenzenesulphonyl) benzamide | 38 |

The foregoing survival values represent the percentage survival of white mice which had been inoculated subcutaneously with fatal doses of Binda Type II pneumococcus culture and to which thereafter were orally administered 20 mg. doses of the indicated substance at intervals of 3, 23, 47 and 72 hours after inoculation.

I claim:

N-(p-Aminobenzene sulphonyl) benzamide, having the structural formula—

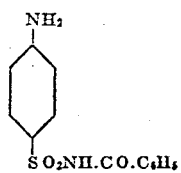

said compound being a colorless crystalline solid which is substantially insoluble in water and forms a water-soluble sodium salt.

MICHAEL N. DVORNIKOFF.

CERTIFICATE OF CORRECTION.

Patent No. 2,240,496.  May 6, 1941.

MICHAEL N. DVORNIKOFF.

It is hereby certified that error appears in the printed specification of the above numbered patent requiring correction as follows: Page 1, first column, line 47, in the formula, for "$SO_2NHNa$''" read --$SO_2NHNa$--; same line, for "$SO_2H.CO.C_6H_5$" read --$SO_2NH.CO.C_6H_5$--; and that the said Letters Patent should be read with this correction therein that the same may conform to the record of the case in the Patent Office.

Signed and sealed this 17th day of June, A. D. 1941.

(Seal)

Henry Van Arsdale,
Acting Commissioner of Patents.